United States Patent [19]

Hu et al.

[11] Patent Number: 5,164,651
[45] Date of Patent: Nov. 17, 1992

[54] STARTING-CURRENT LIMITING DEVICE FOR SINGLE-PHASE INDUCTION MOTORS USED IN HOUSEHOLD ELECTRICAL EQUIPMENT

[75] Inventors: Tien-Cheng Hu; Wen-Hui Cheng; Ling-Hwei Chang; Eric Han, all of Hsinchu, Taiwan

[73] Assignee: Industrial Technology Research Institute, Taiwan

[21] Appl. No.: 725,615

[22] Filed: Jul. 3, 1991

Related U.S. Application Data

[63] Continuation-in-part of Ser. No. 722,211, Jun. 27, 1991, abandoned.

[51] Int. Cl.⁵ .............................................. H02P 1/28
[52] U.S. Cl. .................................................. 318/778
[58] Field of Search ............... 318/778, 779, 785, 786

[56] References Cited

U.S. PATENT DOCUMENTS 3,908,158  9/1975  Studtmann .
4,070,605  1/1978  Hoeppner .
4,100,469  7/1978  Nelson et al. .
4,300,077  11/1981  Katz et al. .

*Primary Examiner*—David Smith, Jr.
*Attorney, Agent, or Firm*—Marks & Murase

[57] ABSTRACT

Disclosed is a starting current limiting device for single-phase induction motors, driven by an AC power supply, used in household electrical equipment. The device is adapted to provide, as the power switch of the induction motor is just turned on, a low and gradually increasing starting current flowing into the induction motor. The device is capable of cutting some portions of each cycle in the waveform of the AC power off such that the average voltage input to the single-phase induction motor is reduced, and/or converting some portions of each cycle to oscillate in the reverse directions such that the waveform of the AC power input to the single-phase induction motor appears to have a lower frequency. The device is provided with a switching circuit including a plurality of thyristors, which can be silicon controlled rectifiers or triacs. A means is provided for generating the triggering signals to fire the thyristors, the triggering signals being predetermined and their timing is controlled by a sequence of timing signals. The sequence of timing signals is generated by a timing signal generator capable of generating a single timing signal every time the AC voltage has a zero-crossing. When the current flowing into the induction motor has reached a predetermined percentage of the rating current, the device would switch off the switching circuit and connect the induction motor directly to the AC power supply.

9 Claims, 12 Drawing Sheets

STARTING-CURRENT LIMITING DEVICE FOR SINGLE-PHASE INDUCTION MOTORS USED IN HOUSEHOLD ELECTRICAL EQUIPMENT

This application is a continuation-in-part of application Ser. No. 07/722,211 filed Jun. 27, 1991 now abandoned.

BACKGROUND OF THE INVENTION

The present invention relates generally to a starting current limiting device for single-phase induction motors used in household electrical equipment.

A household electrical equipment, such as an air conditioner, a refrigerator, a washing machine, or an electrical fan, ordinarily utilizes a single-phase induction motors for the driving purposes since the electrical power readily available from a socket is usually a single-phase AC voltage with a voltage of 110 V and a frequency of 60 Hz.

The induction motor of these household electrical equipment must usually be turned on and turned off repeatedly. For description purpose, the term "working current" is hereinunder defined as the current flowing from a power source into an induction motor, the term "starting current" as the working current when an AC voltage is just applied to an induction motor, and the term "rating current" as the working current when the induction motor is running under a steady state. It is found that the starting current is usually about three to six times as large as the rating current. The extremely large starting current results from the initial high induced potential required to overcome the inertia of the rotor of the induction motor so as to accelerate the rotor.

FIG. 1 shows a characteristic curve of the working current when the starting current limiting device according to the present invention is not used. At an instant $t=t_1$ the power switch is turned on, and the working current arises abruptly from zero to a starting current of $I_S$ and then gradually descends therefrom following a curve "a". The value of the $I_S$ is about four times as large as the value of the rating current $I_R$. At a time $t=t_2$ the value of the working current reaches the rating value $I_R$, and from this time on the working current keeps steady at the rating value $I_R$, as represented by a curve "c". During this period, the induction motor runs under a steady state. At a time $t=t_3$ the power switch is turned off and the current gradually falls to zero, as represented by a curve "d". At a time $t=t_4$ the power switch is turned on again and identical characteristic curve of working current is repeated.

In the period between $t=t_2$ and $t=t_3$ the working current converts substantially all its electrical energy to kinetic energy of the rotor. However, in the initial period between $t=t_1$ and $t=t_2$, the rotational speed of the rotor, due to its inertia, is not able to "catch up with" the high starting current. Therefore, most of the electrical energy carried by the starting current at this time would be converted into heat energy dissipated in the coil, rather than into kinetic energy of the rotor of induction motor. A curve "b" in the figure represents the current induced by the rotation of the rotor. The amount of electrical energy dissipated in the coil is shown by the shaded area between curve "a" and curve "b".

Therefore, since the single-phase induction motors used in household electrical equipment are frequently turned on and turned off, the dissipated electrical energy will be accumulated to a considerable extent.

In addition, since the starting current is large, the acceleration force exerted upon the rotor is also large. The rotor thus suffers from a larger mechanical loss.

Further, the extremely large starting current abruptly applied to the induction motor will inevitably cause a significant voltage drop on other electrical appliances connected to the same power source, and thus adversely affect the operations of those appliances.

SUMMARY OF THE INVENTION

It is therefore a primary object of the present invention to provide a starting current limiting device for single-phase induction motors used in household electrical equipment, which provides a low and gradually increasing starting current at the beginning when the power switch of the induction motor is just turned on.

In accordance with of the present invention, the starting current limiting device is provided with a switching means coupled between the AC power supply and the single-phase induction motor. The switching means is capable of cutting off some portions of each cycle in the waveform of the AC power such that the root mean square voltage input to the single-phase induction motor is attenuated, or further rectifying some portions of each cycle such that the waveform of the AC power input to the single-phase induction motor appears to have a lower frequency. A pulse generator, coupled to the AC power supply, is adapted to generate a sequence of timing pulses. The pulse generator generates a timing pulse at every instant when the AC voltage is zero, i.e. at every zero crossing in the waveform of the AC voltage. As a result, the timing pulses are generated periodically and the sequence of timing pulses is in synchronization with the cycles of the waveform of the AC voltage. A means, comprising a programmable logic unit, is utilized for generating a plurality of predetermined sequences of triggering signal. The timing of the triggering signal is based on the timing pulses from the pulse generator.

BRIEF DESCRIPTION OF THE DRAWINGS

A more detailed understanding of the present invention can be achieved by a reading of the following detailed description in conjunction with the accompanying drawings, wherein.

DETAILED DESCRIPTION OF THE PREFERRED EMBODIMENTS

Figure 2:
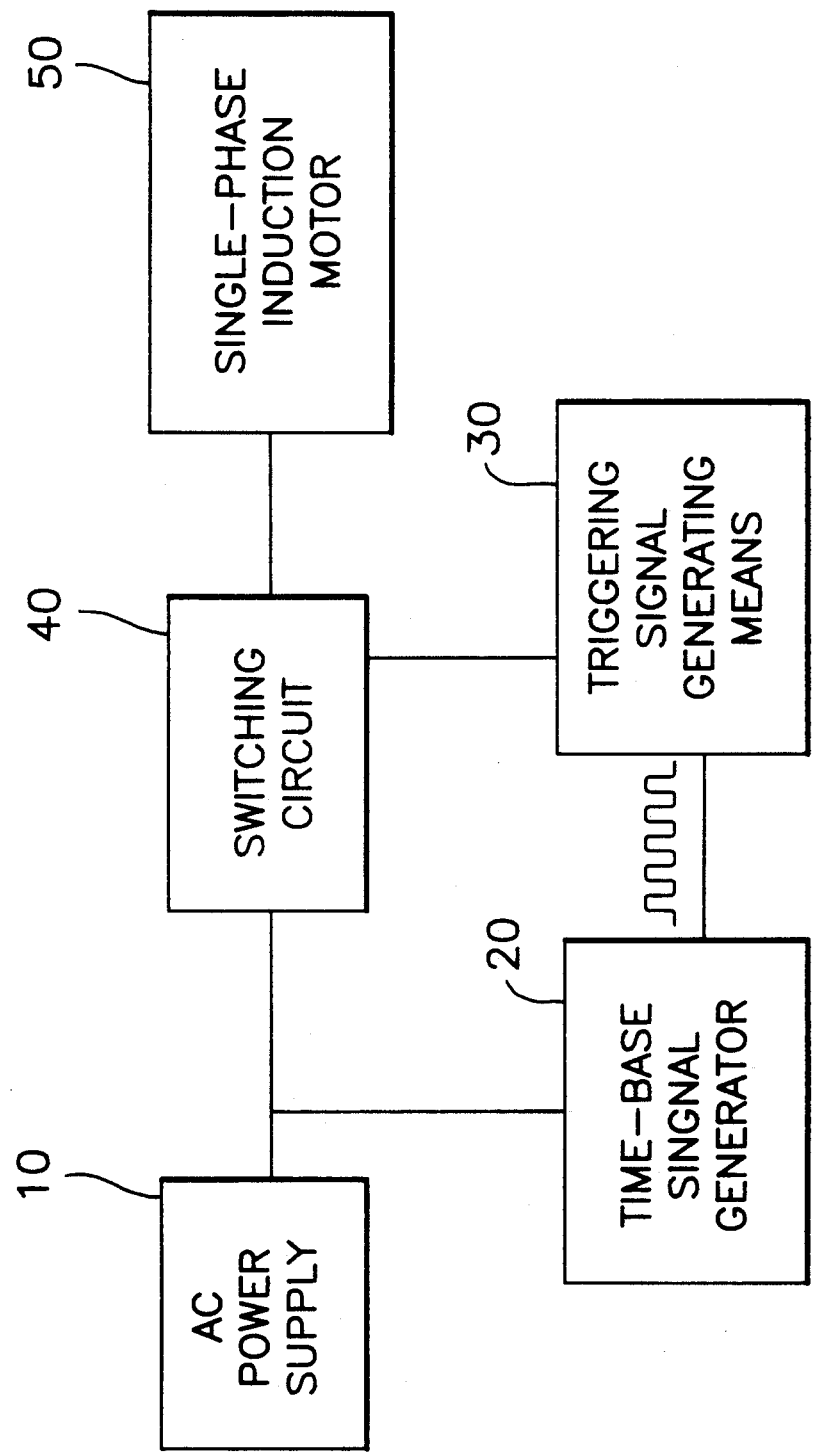
FIG. 2 is a schematic block diagram of the present invention.

FIG. 2 shows a schematic block diagram of the present invention, wherein numeral 10 designates an AC power supply, numeral 20—a timing pulse generator, numeral 30—a means for generating triggering signals numeral 40—a switching circuit, and numeral 50—a single-phase induction motor.

The AC power supply 10 is an electrical power source with a voltage of 110 V and a frequency of 60 Hz generally available from a socket.

Figure 3:
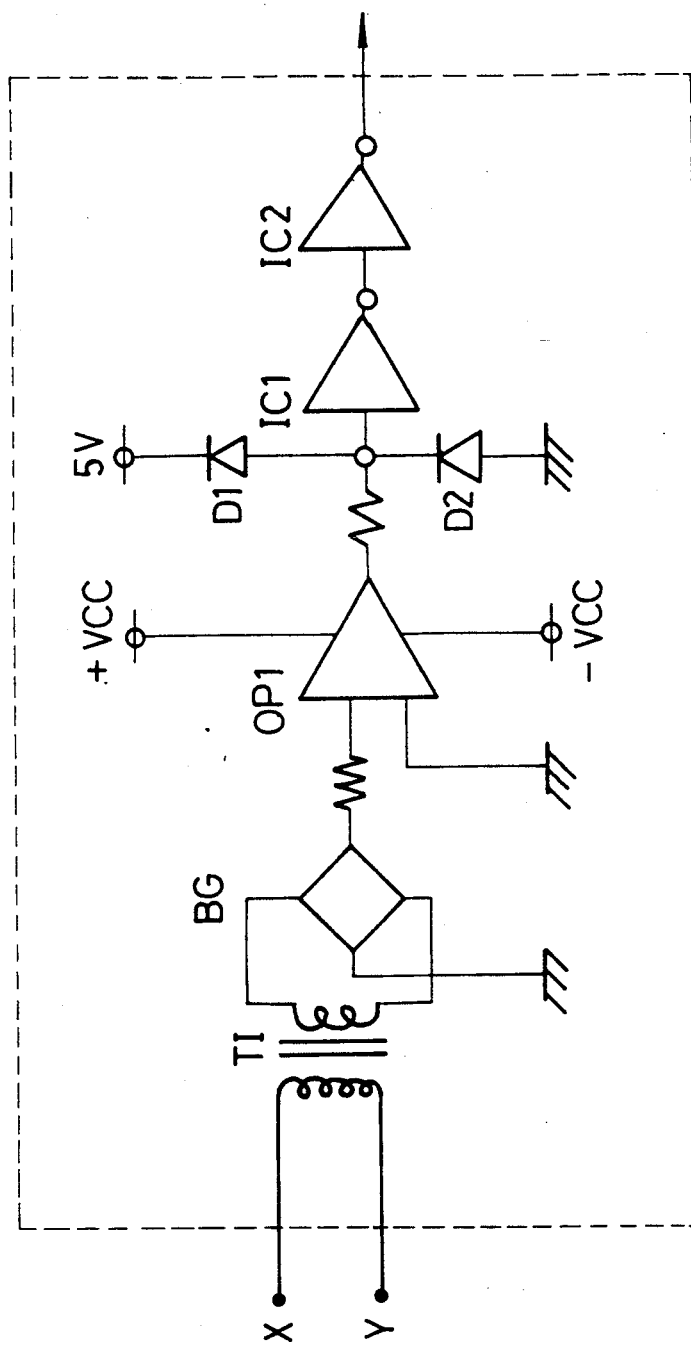
FIG. 3 is the circuit diagram of a timing pulse generator utilized in the present invention.

A detailed circuit diagram of the timing pulse generator 20 is shown in FIG. 3. The timing pulse generator 20 is capable of generating a pulse every time the supplied AC voltage goes to zero, i.e. at every zero crossing in the waveform of the supplied AC voltage. Therefore, since there are two zero-crossings in each cycle of the supplied AC voltage, the timing pulse generator 20 will generate a sequence of timing pulse generator 20 will generate a sequence of timing pulses at a rate of 120 pulses/sec. The interval between two consecutive pulses is 8.33 msec. This sequence of timing pulses will be utilized by the triggering signal generating means 30 as a time base for generating a plurality of triggering signals which should be in synchronization with the waveform of the supplied AC voltage. The operation of the triggering signal generator 30 will be described later.

First Preferred Embodiment

Figure 4:
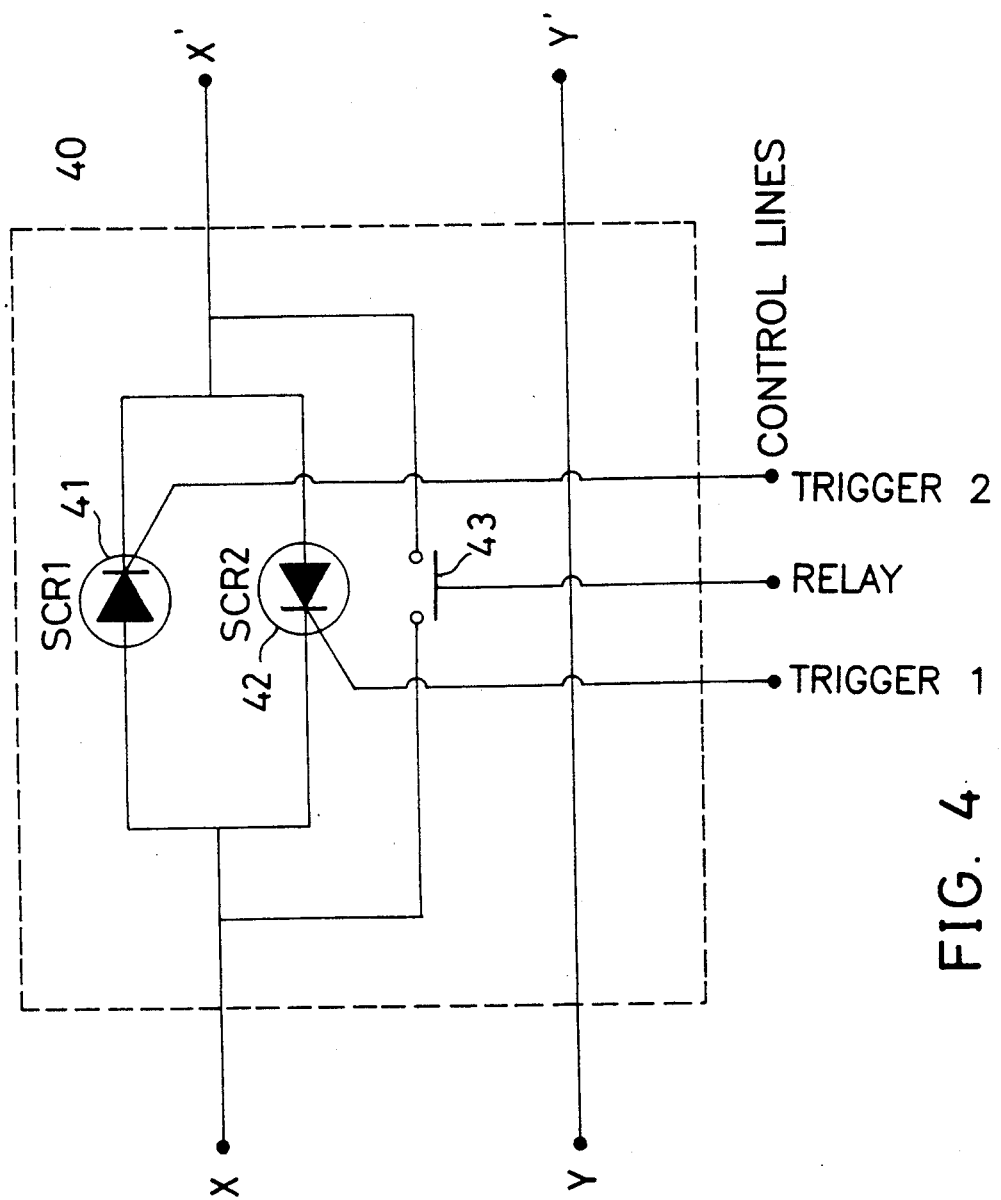
FIG. 4 is the circuit diagram of a switching circuit utilized in the first preferred embodiment of the present invention.

Referring now to FIG. 4, there is shown the circuit diagram of the switching circuit 40 utilized in the first preferred embodiment of the present invention. The switching circuit 40 comprises a pair of SCRs (silicon controlled rectifiers) 41, 42 and a relay 43. Two control lines, indicated respectively by TRIGGER 1 and TRIGGER 2, are connected from the triggering signal generating means 30 (not shown in FIG. 4) to the gates of the two SCRs 41, 42. The two lines are used to transmit, from the triggering signal generating means 30, the triggering signals capable of firing the SCRs 41, 42. Since SCRs are widely utilized semiconductor devices and are well known to those skilled in the art of electronics, its detailed description is omitted.

Figure 5:
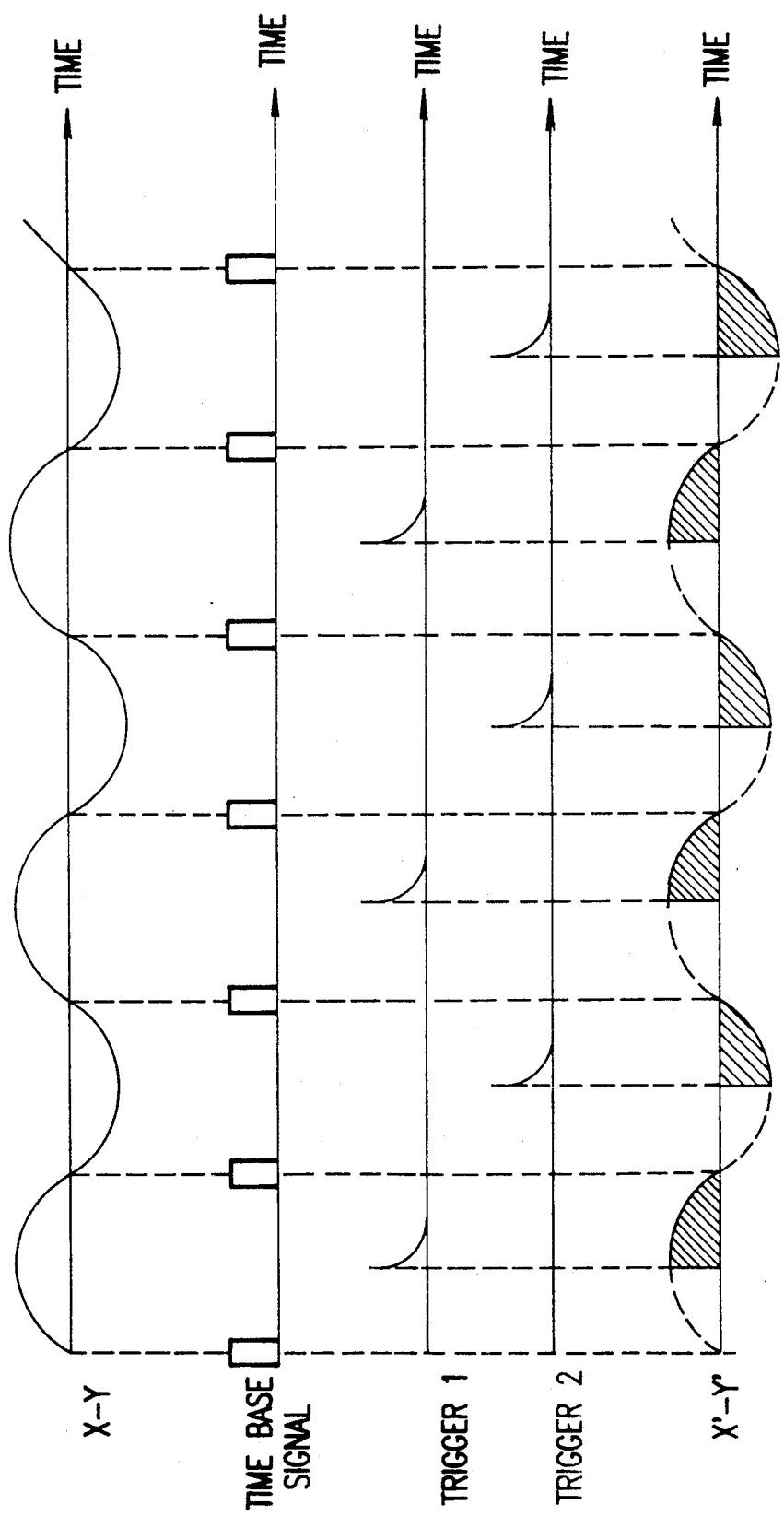
FIG. 5 shows waveform diagrams of the input voltage, output voltage and triggering signals of a starting current limiting device according to the first preferred embodiment of the present invention.

FIG. 5 shows two predetermined sequences of triggering signals utilized to fire the SCRs 41, 42. Initially, as the AC voltage begins its positive alternation, both the SCRs 41, 42 are closed. At the instant the positive half cycle reaches its peak, a pulse appears in the control line TRIGGER 1 and fires the SCR 41. The SCR 41 is thereby conducted and the AC voltage is able to be delivered to the induction motor 50 therethrough. As the AC voltage goes to zero, the SCR 41 becomes open and the AC voltage is again unable to be delivered to the induction motor 50, the AC voltage then begins its negative alternation, and at the instant the negative half cycle reaches its peak, a pulse appears in the control line TRIGGER 2 and fires the SCR 42. The SCR 42 is thereby conducted and the subsequent negative alternation of the AC voltage is delivered to the induction motor 50. As the AC voltage returns to zero, the SCR 42 becomes open and the AC voltage is again unable to be delivered to the induction motor 50.

The waveform of the voltage appearing at the two input ports x' and y' of the induction motor 50 is shown in FIG. 5, along with the waveform of the supplied AC voltage, the timing signals, and the triggering signals.

As the speed of the rotor gradually increases, the rate of the triggering pulses appearing in the control lines TRIGGER 1 and TRIGGER 2 will become faster and faster such that a larger portion in each of the positive and the negative half cycles of the supplied AC voltage will be delivered to the induction motor 50. This will gradually increase the average power delivered to the induction motor 50. As the interval between two consecutive pulses becomes shorter than 1.0 msec, the average power input to the induction motor 50 is about 95% of the rating power input. At this moment, the triggering signal generating means will stop transmitting triggering pulses to the SCRs 41, 42 and send an engage signal via the control line RELAY to the relay 43. The SCRs 41, 42 thus become open and the relay 43 becomes engaged. The AC power supply 10 thereby transmits all its power directly to the induction motor 50. The relay 43 will be disengaged when the power switch of the induction motor 50 is turned off.

Second Preferred Embodiment

Figure 6:
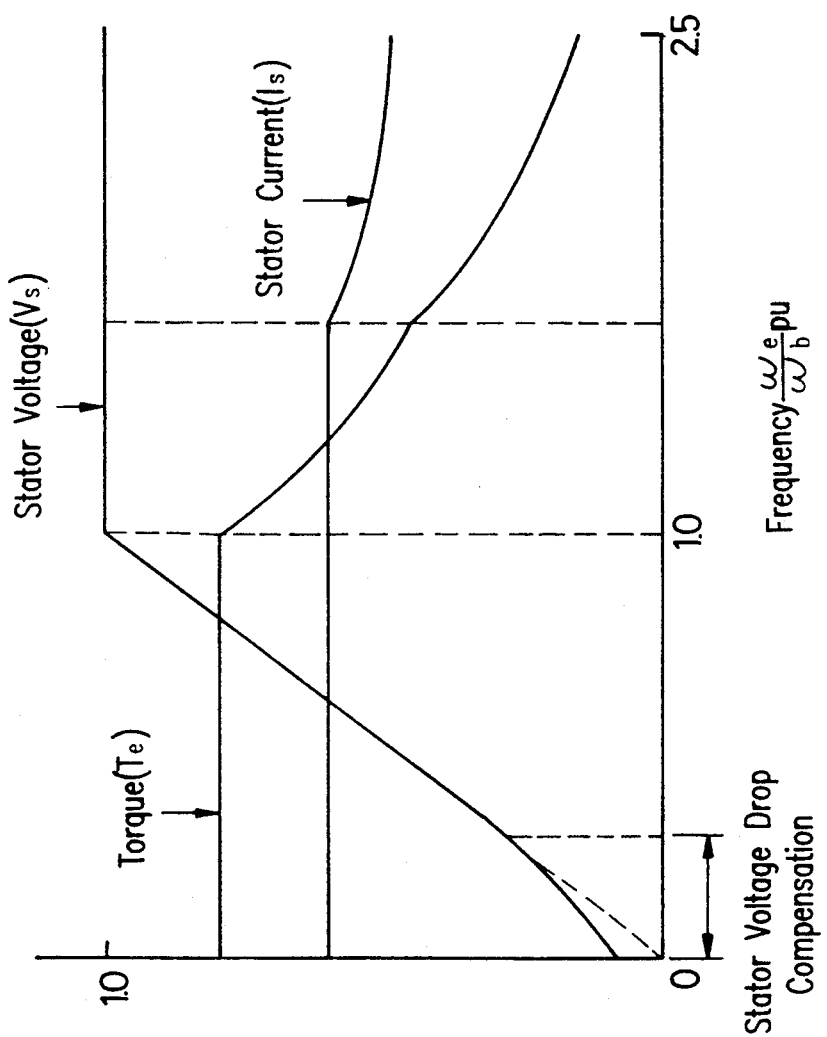
FIG. 6 is a graphical representation, showing the characteristic curves of the torque, the stator voltage, and the stator current with respect to the frequency of input voltage.

In a single-phase induction motor utilized in a household electrical equipment, the flux density therewithin is designed to have a maximum value at a frequency of 60 Hz such that the induction motor would exhibit maximum power transducing efficiency at this frequency. Therefore, in order to keep the induction motor under the optimum condition, the flux density within the induction motor has to be kept constant. In accordance with electrical principles, the flux density within an induction motor is proportional to the average input power and inversely proportional to the frequency of the input voltage, i.e. proportional to V/F. Therefore, keeping the value of V/F constant is equivalent to keeping the value of V/F constant. As show in FIG. 6, utilizing the V/F characteristic curve the torque and the stator current of the induction motor can be kept constant in a frequency range below the rating frequency.

In the first preferred embodiment, the value of V increases gradually from an initial value, while the value of F is kept at 60 Hz. Therefore, the value of V/F is varied and so is the flux density within the induction motor. The starting current limiting device according to the first preferred embodiment has good results in providing a low starting current. However, if the value of V/F is kept constant throughout the initial stage, a better result will be provided. It is therefore the purpose of a second preferred embodiment of the present invention to maintain the value of V/F substantially constant over the whole initial stage.

Figure 7A:
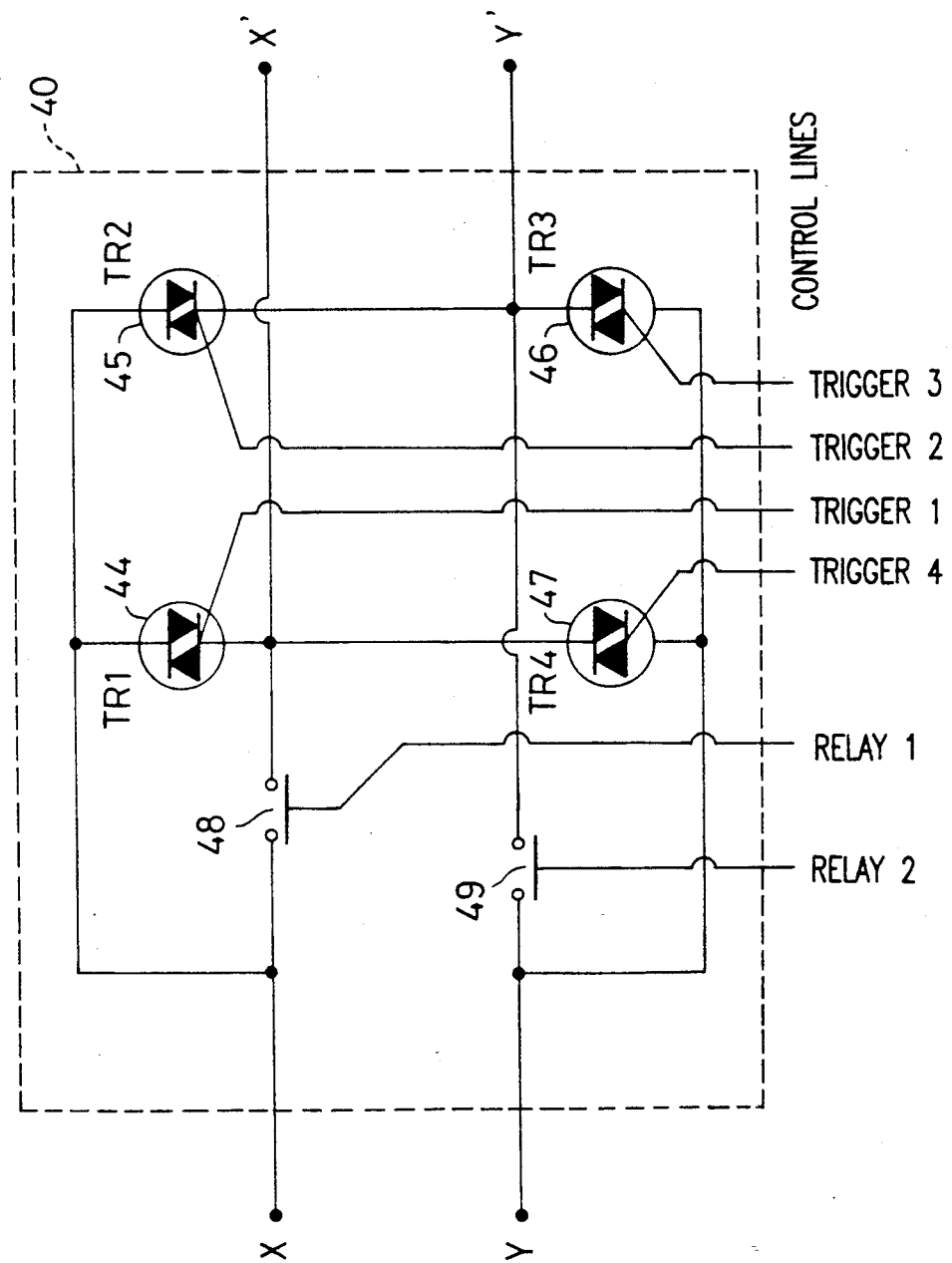
FIG. 7A is the circuit diagram of a switching device utilized in the second preferred embodiment of the present invention.
Figure 7B:
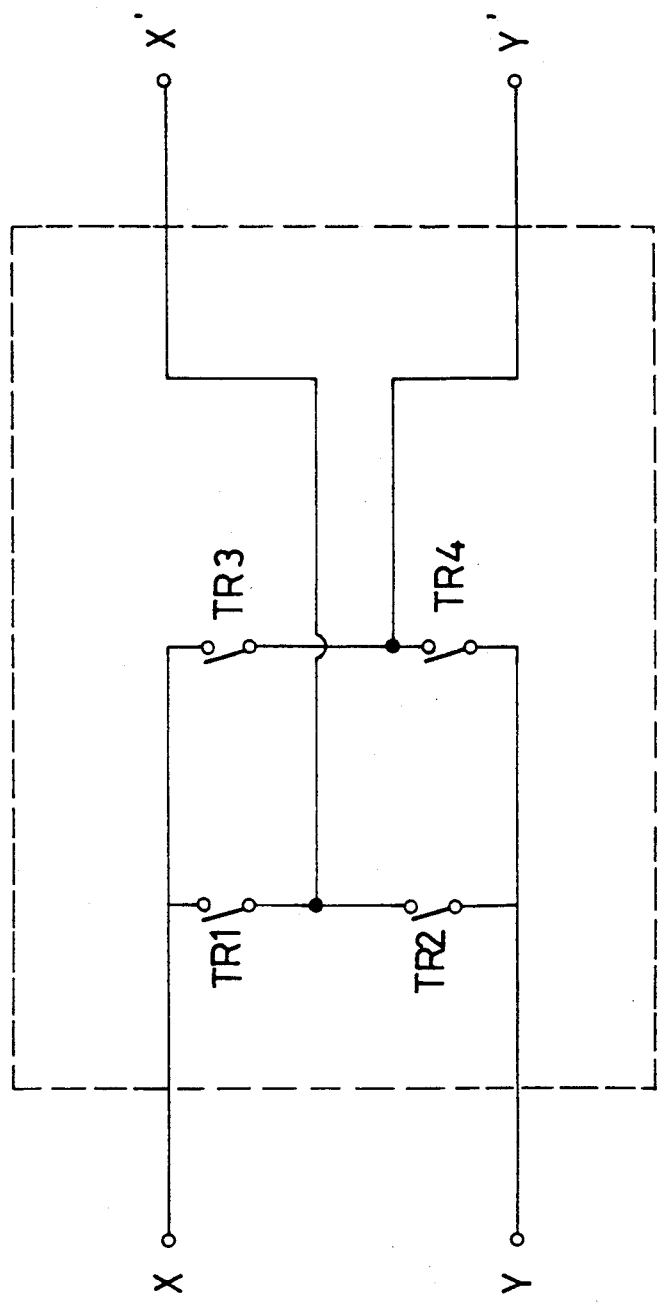
FIG. 7B is an equivalent circuit of the triacs shown in FIG. 6A.

Referring to FIG. 7A, there is shown the circuit diagram of a switching device utilized in a second preferred embodiment of the present invention. This switching device comprises four triacs 44, 45, 46, 47 and two relays 48, 49. Six control lines, indicated respectively by TRIGGER 1, TRIGGER 2, TRIGGER 3, TRIGGER 4, RELAY 1 and RELAY 2, are connected from the triggering signal generating means 30 (not shown) to the gates of the four triacs 44, 45, 46, 47 and to the relays 48, 49. An equivalent circuit of the triacs 44, 45, 46 and 47 is shown in FIG. 7B. Since triacs are widely used semiconductor elements and are well known to those skilled in the art of electronics, their description is thus omitted.

Figure 8A:
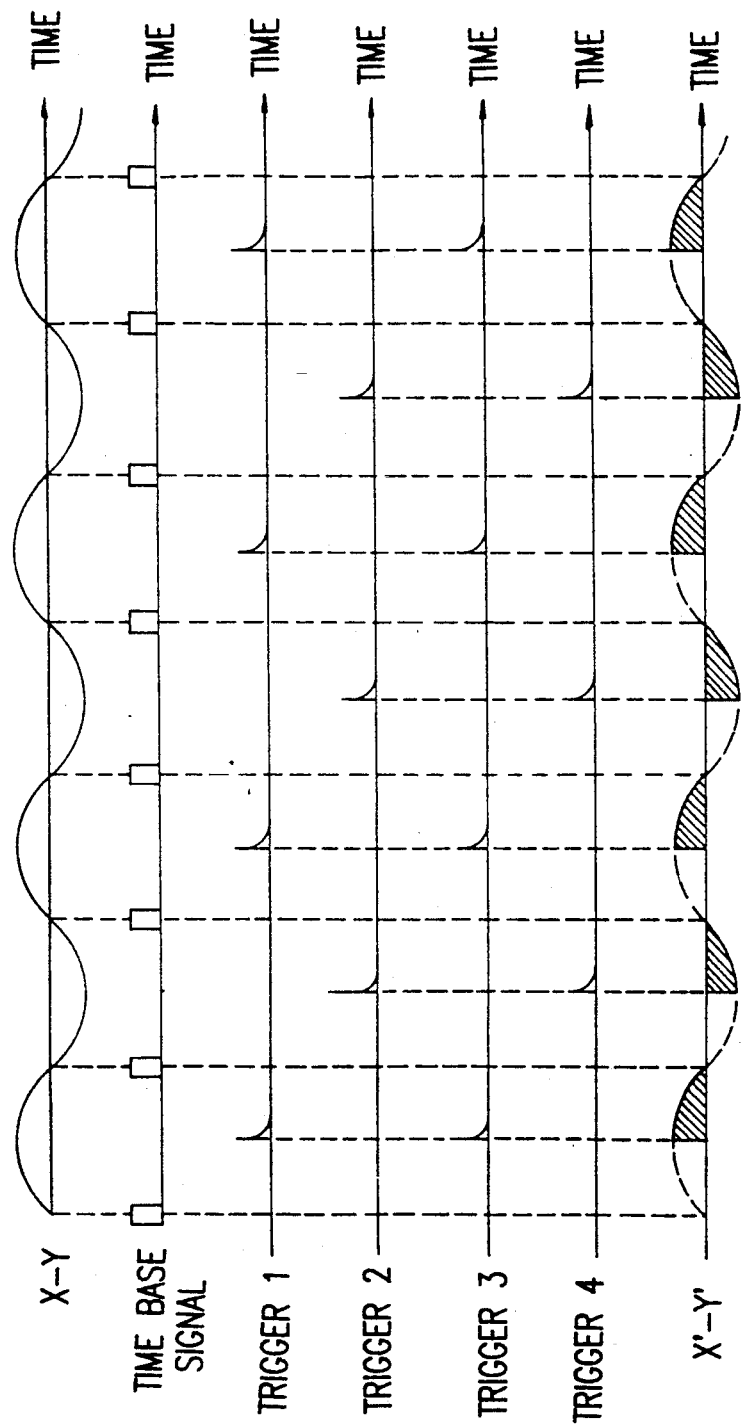
FIGS. 8A-8C show waveform diagrams of the input voltage, output voltage and triggering signals of a starting current limiting device according to the second preferred embodiment of the present invention.

Referring to FIG. 8A, if the triggering pulse sequences in the control lines TRIGGER 1-4 are predetermined as shown, the waveform of the voltage appearing at the ports x' and y' will take the shape as shown in the same figure. The waveform of the voltage appearing at the ports x' and y' is basically the same as that in the first embodiment.

Figure 8B:
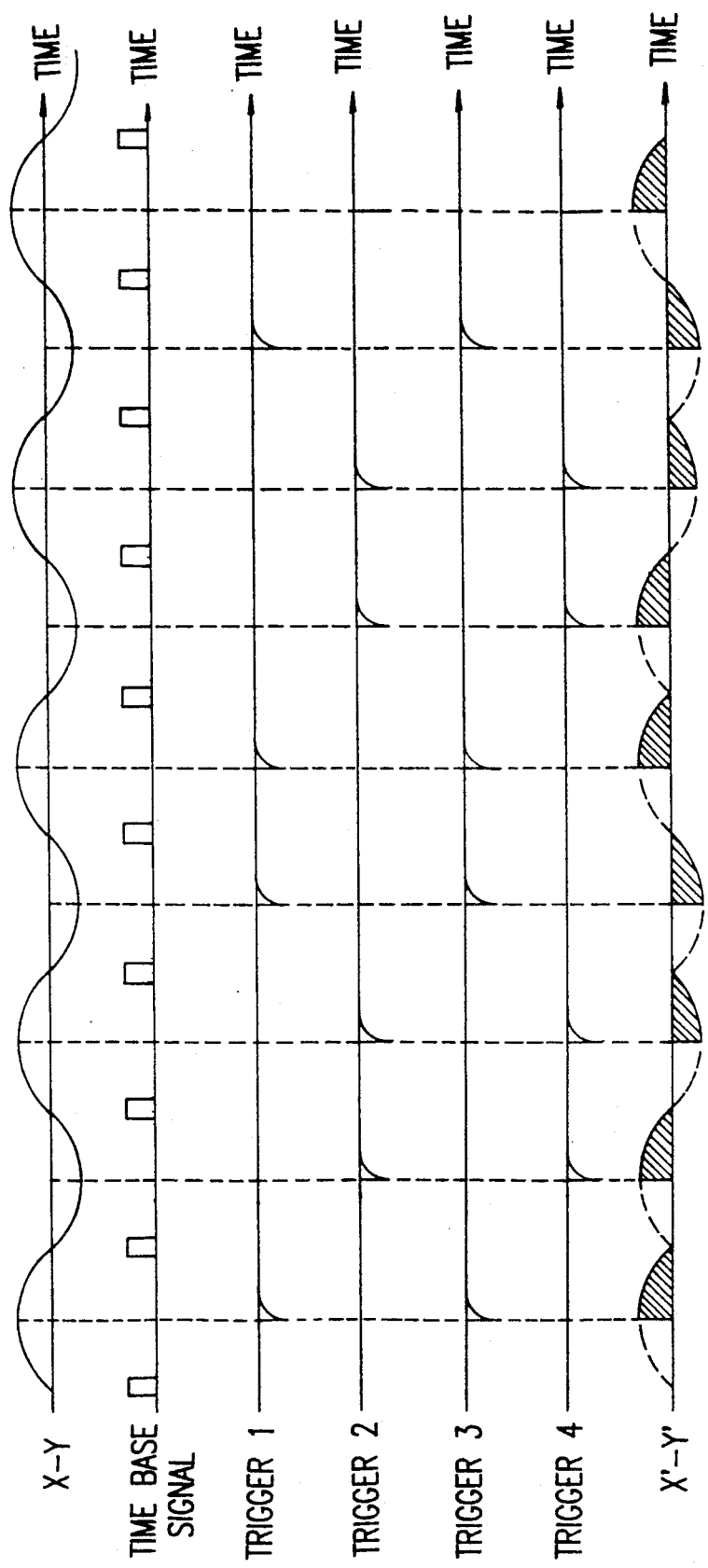

Referring now to FIG. 8B, if the triggering pulse sequences in the control lines TRIGGER 1-4 are predetermined as shown in this figure, the waveform of the voltage appearing at the input ports x' and y' of the induction motor will be different from that shown in FIG. 8A. A cycle in this waveform consists two consecutive alternations in the positive direction and then two consecutive alternations in the negative direction, thus changing the frequency of the waveform into 30 Hz. Consequently, the average power input to the induction motor 50 maintains the same as the case shown in FIG. 8A, while the frequency is only half as large.

Figure 8C:
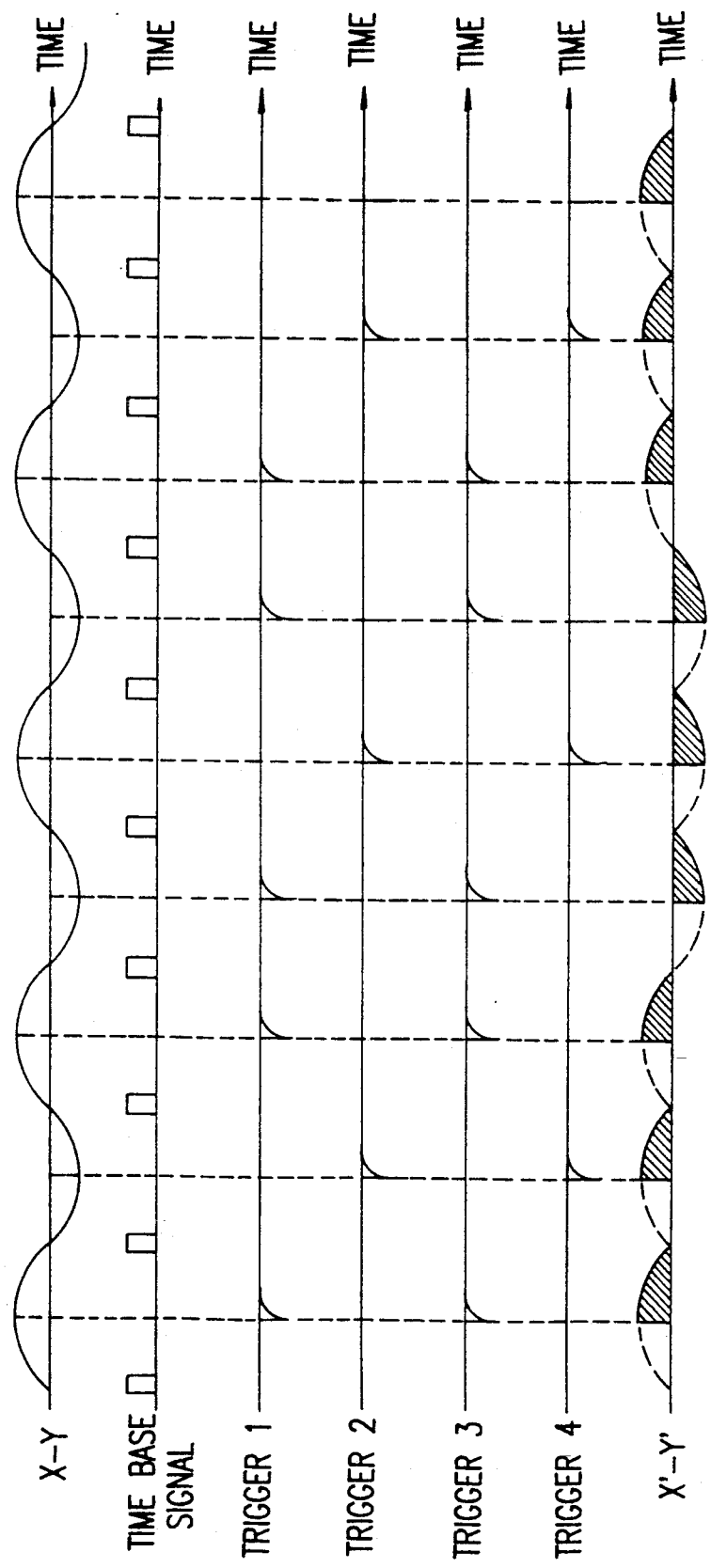

Referring further to FIG. 8C, in this case, the triggering signals are predetermined in such a way that a cycle in the waveform of the voltage input to the induction motor 50 consists three consecutive alternations in the negative direction. The frequency of the waveform is therefore 20 Hz.

The frequency of the waveform associated with the voltage input to the induction motor 50 is designed to be a factor of 60, which is the value of the frequency of the AC power supply 10. Thus, the frequency may be 60, 30, 20, 15, 12, 10, 6, 5, 4, 3, 2, or 1 Hz. To produce a waveform with a prescribed frequency, the sequence of the triggering signals required for firing the triacs are first researched and the results are then recorded in a table given below:

TABLE 1

| Frequency | Triac | Triggering Pulse Sequence |
|---|---|---|
| 60 Hz | TR 1&3 | 1 0 1010101010101010... |
|  | TR 2&4 | 0 1 0101010101010101... |
| 30 Hz | TR 1&3 | 1 0 0 1 1001100110011001... |
|  | TR 2&4 | 0 1 1 0 0110011001100110... |
| 20 Hz | TR 1&3 | 1 0 1 1 0 1 101101101101110... |
|  | TR 2&4 | 0 1 0 0 1 0 010010010010001... |
| 15 Hz | TR 1&3 | 1 0 1 0 0 1 0 1 101001011010... |
|  | TR 2&4 | 0 1 0 1 1 0 1 0 010101100101... |

In the above table, a digit 1 represents the presence of a pulse, and a digit 0 represents the absence of a pulse. It can be found that each circled group of digits repeats in the subsequent sequences. The occurrence of each digit is governed by the timing pulses from the timing pulse generator 20.

The waveform of the voltage input to the induction motor 50 is designed such that the V/F value at any time during the starting stage would correspond to a flux density closely equal to the flux density of the induction motor 50 operating at 60 Hz. Since, initially, the value of V is low, the value of F should also be low. As the average power input to the induction motor 50 increases, the triggering generating means 30 would change the sequence of triggering signals such that the frequency of the produced waveform is increased. It is the same as that in the first preferred embodiment that, when the current flowing into the induction motor 50 has reached 95% of the rating current, the triggering signal generating means 30 would stop sending triggering signals to the triacs 44, 45, 46, 47, and send engage signals via the two control lines RELAY 1 and RELAY 2 to the relays 48, 49. The triacs 44, 45, 46, 47 thus become open and the relays 48, 49 become engaged. The AC power supply 10 thereby transmits all its power directly to the induction motor 50. The relays 48, 49 will be disengaged when the power switch of the induction motor 50 is turned off.

Figure 1:
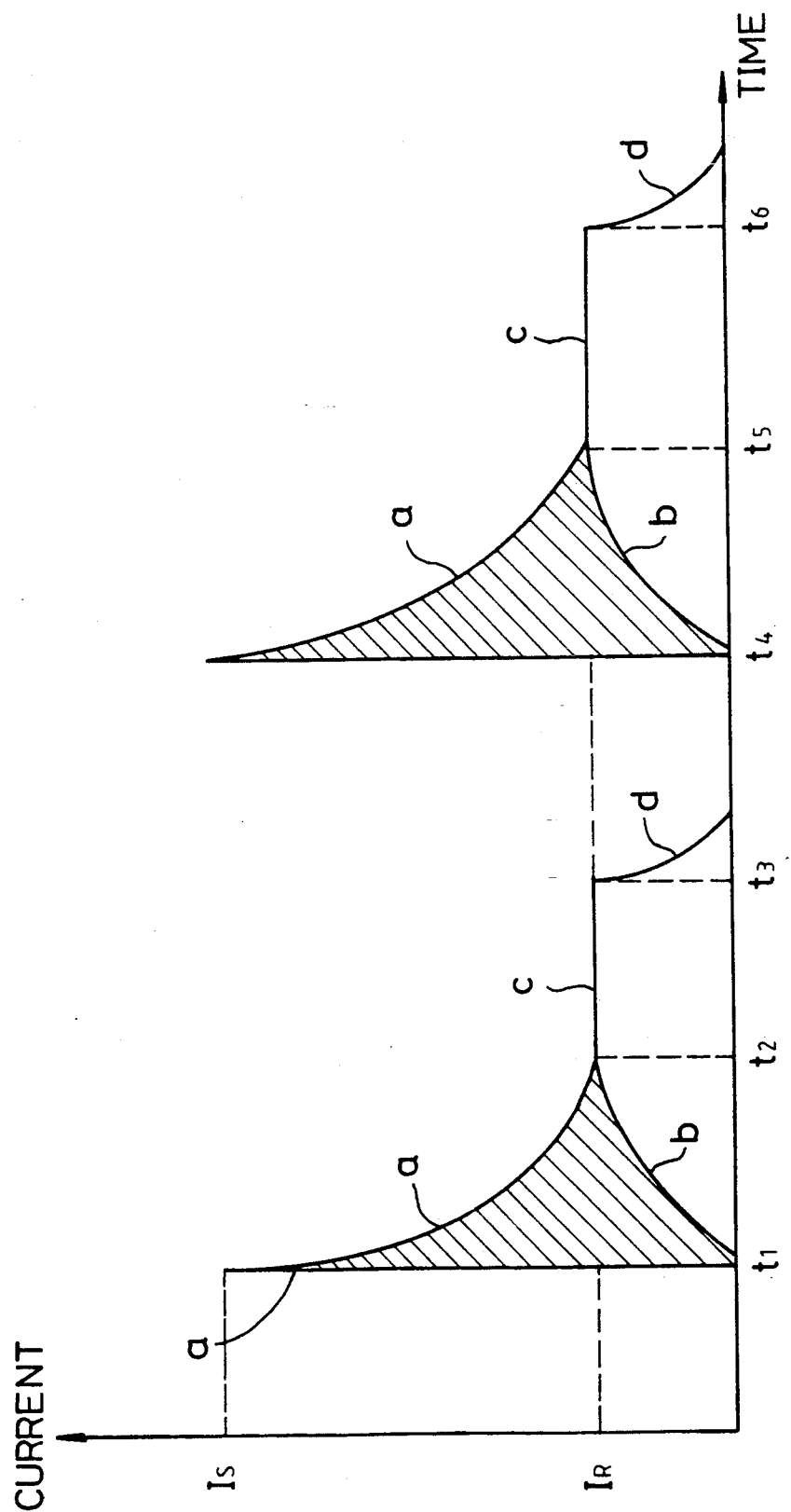
FIG. 1 is a graphical representation, showing the characteristic curve of the working current when the starting current limiting device according to the present invention is not used.
Figure 9:
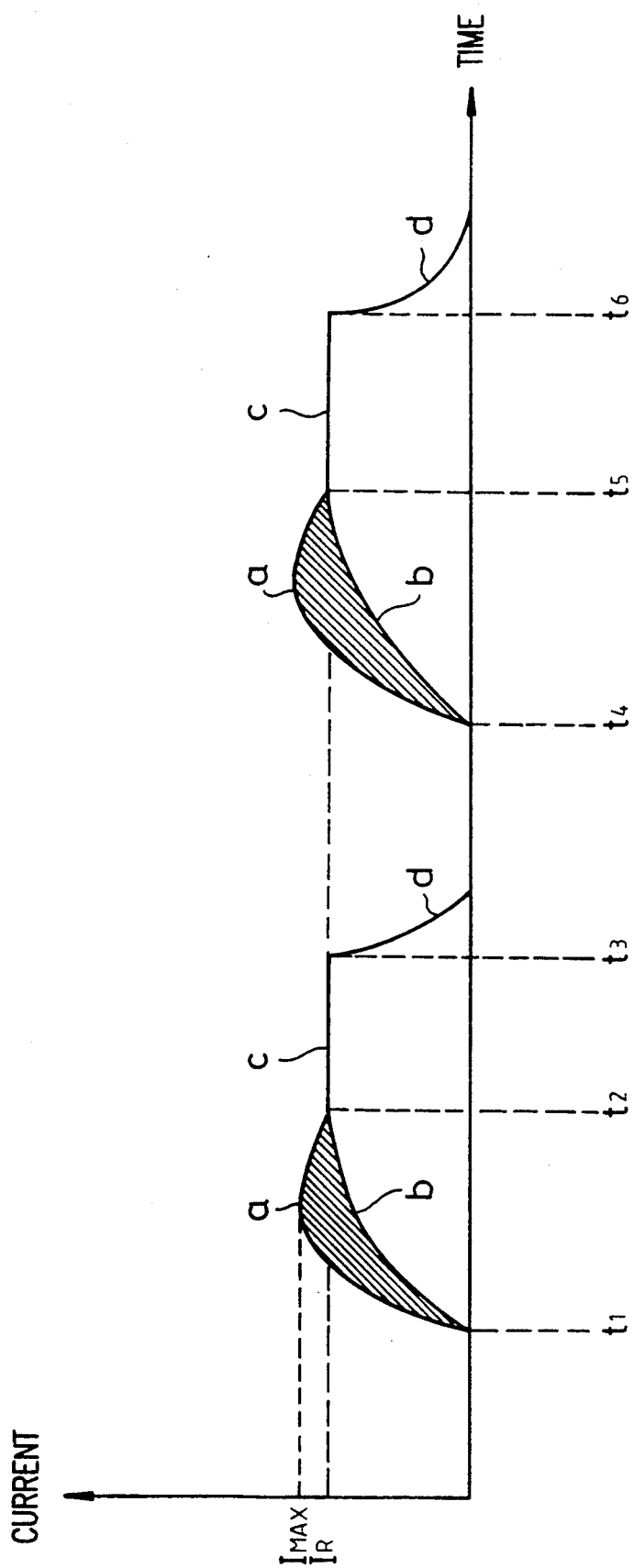
FIG. 9 is a graphical representation similar to FIG. 1, showing the characteristic curve of the working current when the starting current limiting device according to the present invention is used.

Referring to FIG. 9, there is shown a characteristic curve of the current flowing into the induction motor 50 when the apparatus according to the present invention is used. As can be seen, at the instant $t=t_1$ the power switch is turned on, the current rises gradually from zero to a peak value slightly above the value of the rating current $I_R$. And then at the time $t=t_2$ the value of the rating current returns to the value of the rating current. The electrical power dissipated as heat in the coil is represented by the shaded area between $t=t_1$ and $t=t_2$, which, compared to that shown in FIG. 1 wherein the present invention is not utilized, is much less.

While the invention has been described by way of example and in terms of a preferred embodiment, it is to be understood that the invention need not be limited to the disclosed embodiment. On the contrary, it is intended to cover various modifications and similar arrangements included within the spirit and scope of the appended claims, the broadest interpretation so as to encompass all such modifications and similar structures.

What is claimed is:

1. An apparatus for use in the suppression of the starting current supplied by a single-phase AC power source supplying an AC voltage with a fundamental frequency, said apparatus comprising:
    means for generating a timing signal in accordance with the waveform of the AC voltage supplied by the single-phase AC power source;
    means responsive to the timing signal for generating triggering signals with predetermined patterns;
    switching means which connects the single-phase AC power source to the single-phase AC motor, said switching means modifying in response to the triggering signals the waveform of the AC voltage supplied by the single-phase AC power source into a waveform-modified voltage with the ratio V/F thereof maintained at a value substantially equal to the flux density of the single-phase AC motor, where V is the average power of the waveform-modified voltage, and F is the frequency of the waveform-modified voltage;
    said switching means directly connecting the single-phase AC power source to the single-phase AC motor when the current delivering into the single-phase AC motor has reached a predetermined value.

2. An apparatus according to claim 1, wherein said switching means comprises:
    a first network having a first TRIAC connected in series with a second TRIAC;
    a second network having a third TRIAC connected in series with a fourth TRIAC, said second network being connected in parallel with said first network, said parallel connected first and second networks being connected in series to the single-phase AC power source;

a pair of relays connecting respectively each of the two power lines of the single-phase AC power source to a first intermediate node formed between said serially connected first TRIAC and second TRIAC and to a second intermediate node formed between said serially connected third TRIAC and fourth TRIAC;

the power delivered to the single-phase AC motor being fetched across the first intermediate node and the second intermediate nods; and wherein the triggering signals are used to fire said four TRIAC such that a series of waveform-modified voltages appears one after the other across the first intermediate node and the second intermediate node, the frequencies of the waveform-modified voltage being the factors of the fundamental frequency of the supplied AC voltage.

3. An apparatus according to claim 2, wherein the fundamental frequency is 60 Hz and the frequencies of the waveform-modified voltages are 30 Hz, 20 Hz, 15 Hz, 12 Hz, 10 Hz, 6 Hz, 5 Hz, 4 Hz, 3 Hz, 2 Hz, and 1 Hz.

4. An apparatus according to claim 3, wherein the triggering signals in association with each frequency for firing said four TRIACs are pulse trains with the pulses thereof appearing in a predetermined sequence.

5. An apparatus according to claim 4, wherein at the fundamental frequency 60 Hz the pulse sequence (1,0) appears periodically for firing simultaneously said first TRIAC and said third TRIAC, and the pulse sequence (0,1) appears periodically for firing simultaneously said second TRIAC and said fourth TRIAC.

6. An apparatus according to claim 4, wherein at the frequency 30 Hz the pulse sequence (1,0,0,1) appears periodically for firing simultaneously said first TRIAC and said third TRIAC, and the pulse sequence (0,1,1,0) appears periodically for firing simultaneously said second TRIAC and said fourth TRIAC.

7. An apparatus according to claim 4, wherein at the frequency 20 Hz the pulse sequence (1,0,1,1,0,1) appears periodically for firing simultaneously said first TRIAC and said third TRIAC, and the pulse sequence (0,1,0,0,1,0) appears periodically for firing said second TRIAC and said fourth TRIAC.

8. An apparatus according to claim 4, wherein at the frequency 15 Hz the pulse sequence (1,0,1,0,0,1,0,1) appears periodically for firing simultaneously said first TRIAC and said third TRIAC, and the pulse sequence (0,1,0,1,1,0,1,0) appears periodically for firing said second TRIAC and said fourth TRIAC.

9. An apparatus according to claim 2, wherein the predetermined value of the current delivering into the single-phase AC motor is 95% of the rated current of the single-phase AC motor, as the predetermined value has been reached said four TRIACs being disconnected and said pair of relays being engaged for conducting the delivering power directly to the AC motor.

* * * * *